(12) United States Patent
Stanhope et al.

(10) Patent No.: US 12,471,517 B2
(45) Date of Patent: Nov. 18, 2025

(54) WHEEL ASSEMBLY WITH INTEGRATED SENSOR FOR AN AGRICULUTRAL IMPLEMENT

(71) Applicant: CNH Industrial America LLC, New Holland, PA (US)

(72) Inventors: Trevor Stanhope, Oak Lawn, IL (US); Michael Christopher Conboy, Chicago, IL (US)

(73) Assignee: CNH Industrial America LLC, New Holland, PA (US)

(*) Notice: Subject to any disclaimer, the term of this patent is extended or adjusted under 35 U.S.C. 154(b) by 1021 days.

(21) Appl. No.: 17/540,701

(22) Filed: Dec. 2, 2021

(65) Prior Publication Data

US 2023/0172094 A1    Jun. 8, 2023

(51) Int. Cl.
| | |
|---|---|
| A01C 5/06 | (2006.01) |
| A01B 47/00 | (2006.01) |
| A01B 61/04 | (2006.01) |
| A01B 63/22 | (2006.01) |
| A01B 79/00 | (2006.01) |
| A01C 7/08 | (2006.01) |
| A01C 7/10 | (2006.01) |
| A01C 7/20 | (2006.01) |
| A01C 15/00 | (2006.01) |

(52) U.S. Cl.
CPC ............. *A01C 5/068* (2013.01); *A01B 47/00* (2013.01); *A01B 61/046* (2013.01); *A01B 63/22* (2013.01); *A01B 79/005* (2013.01); *A01C 5/064* (2013.01); *A01C 7/084* (2013.01); *A01C 7/105* (2013.01); *A01C 7/107* (2013.01); *A01C 7/203* (2013.01); *A01C 7/205* (2013.01); *A01C 15/006* (2013.01)

(58) Field of Classification Search
CPC ....... A01C 5/068; A01B 47/00; G01N 33/245
See application file for complete search history.

(56) References Cited

U.S. PATENT DOCUMENTS

| 7,938,074 | B2* | 5/2011 | Liu | A01C 5/068 |
| | | | | 111/194 |
| 9,693,496 | B2* | 7/2017 | Tevs | A01C 5/064 |
| 9,891,155 | B2* | 2/2018 | Eising | G01N 15/1459 |
| 9,930,826 | B2* | 4/2018 | McCloskey | A01C 5/068 |
| 2020/0060068 | A1* | 2/2020 | Stanhope | A01C 7/205 |
| 2020/0390025 | A1* | 12/2020 | Schoeny | A01B 79/005 |

FOREIGN PATENT DOCUMENTS

| DE | 3503347 A1 * | 8/1986 | |
| DE | 102021123828 A1 * | 3/2023 | ............. A01C 5/068 |
| WO | WO-2004023422 A1 * | 3/2004 | ............. B60C 23/041 |

* cited by examiner

*Primary Examiner* — Alicia Torres
(74) *Attorney, Agent, or Firm* — Dority & Manning, P.A.

(57) ABSTRACT

In one aspect, a wheel assembly configured for use with an agricultural implement. The wheel assembly includes a wheel comprising an outer ground-engaging element and an inner hub extending radially inwardly from the outer ground-engaging element. The wheel defines an internal cavity radially inwardly relative to the outer ground-engaging element. The wheel assembly further includes a sensor positioned within the internal cavity of the press wheel.

21 Claims, 9 Drawing Sheets

WHEEL ASSEMBLY WITH INTEGRATED SENSOR FOR AN AGRICULUTRAL IMPLEMENT

FIELD

The present disclosure generally relates to field operations performed using an agricultural implement, such as a planter or a seeder, and, more particularly, to an agricultural implement having a wheel assembly with an integrated sensor.

BACKGROUND

Planting implements, such as planters, are generally known for performing planting operations within a field. A typical planter includes a plurality of row units, with each row unit including various ground engaging tools for creating a furrow within the soil, placing a seed within the furrow, and closing the soil around the seed. For instance, a row unit will often include one or more opener discs configured to create a furrow within the soil and one or more closer discs positioned aft of the opener disc(s), with the closer disc(s) being configured to close the furrow following the deposition of a seed therein. Additionally, row units often include a press wheel that trails the closer disc(s) and rolls over the closed furrow to firm the soil around the seed.

Typically, to monitor the operation of a given row unit, a sensor will often be provided with unit's seed tube for detecting seeds as they pass through the tube before being deposited within the furrow. Such sensor data is then used to estimate certain seed-related parameters, such as the seeding rate. However, since the seed tube sensor is detecting the seeds prior to their deposition within the soil, the associated sensor data cannot be used to accurately estimate parameters related to the placement of seeds within the soil, particularly since the seeds may bounce, roll, or otherwise land off-target as they are dropped from the seed tube into the furrow. Seeds may also be displaced during the furrow closing process, which cannot be detected using the seed tube sensor.

Accordingly, an improved wheel configuration that allows for a sensor to be incorporated therein would be welcomed in the technology. In particular, an improved press wheel configuration that allows for a sensor to be incorporated therein to allow seed placement parameters and/or field-related parameter to be monitored would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a row unit configured for use with an agricultural implement. The row unit includes a frame, a furrow opening assembly supported relative to the frame and being configured to create a furrow in soil, and a furrow closing assembly supported relative to the frame and being configured to close the furrow formed in the soil. The row unit also includes a press wheel supported relative to the frame and being configured to move over the closed furrow, and a sensor supported within the press wheel.

In another aspect, the present subject matter is directed to a wheel assembly configured for use with an agricultural implement. The wheel assembly includes a wheel comprising an outer ground-engaging element and an inner hub extending radially inwardly from the outer ground-engaging element. The wheel defines an internal cavity radially inwardly relative to the outer ground-engaging element. The wheel assembly further includes a sensor positioned within the internal cavity of the press wheel.

In a further aspect, the present subject matter is directed to a row unit configured for use with an agricultural implement. The row unit includes a frame, a furrow opening assembly supported relative to the frame and being configured to create a furrow in soil, and a furrow closing assembly supported relative to the frame and being configured to close the furrow formed in the soil. The row unit further includes a track-based press wheel assembly supported relative to the frame and being configured to move over the closed furrow. The track-based press wheel assembly includes a track frame, a first press wheel supported relative to the track frame for rotation about a first axis of rotation, a second press wheel support relative to the track frame for rotation about a second axis of rotation, and an endless track looped around the first and second press wheels.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
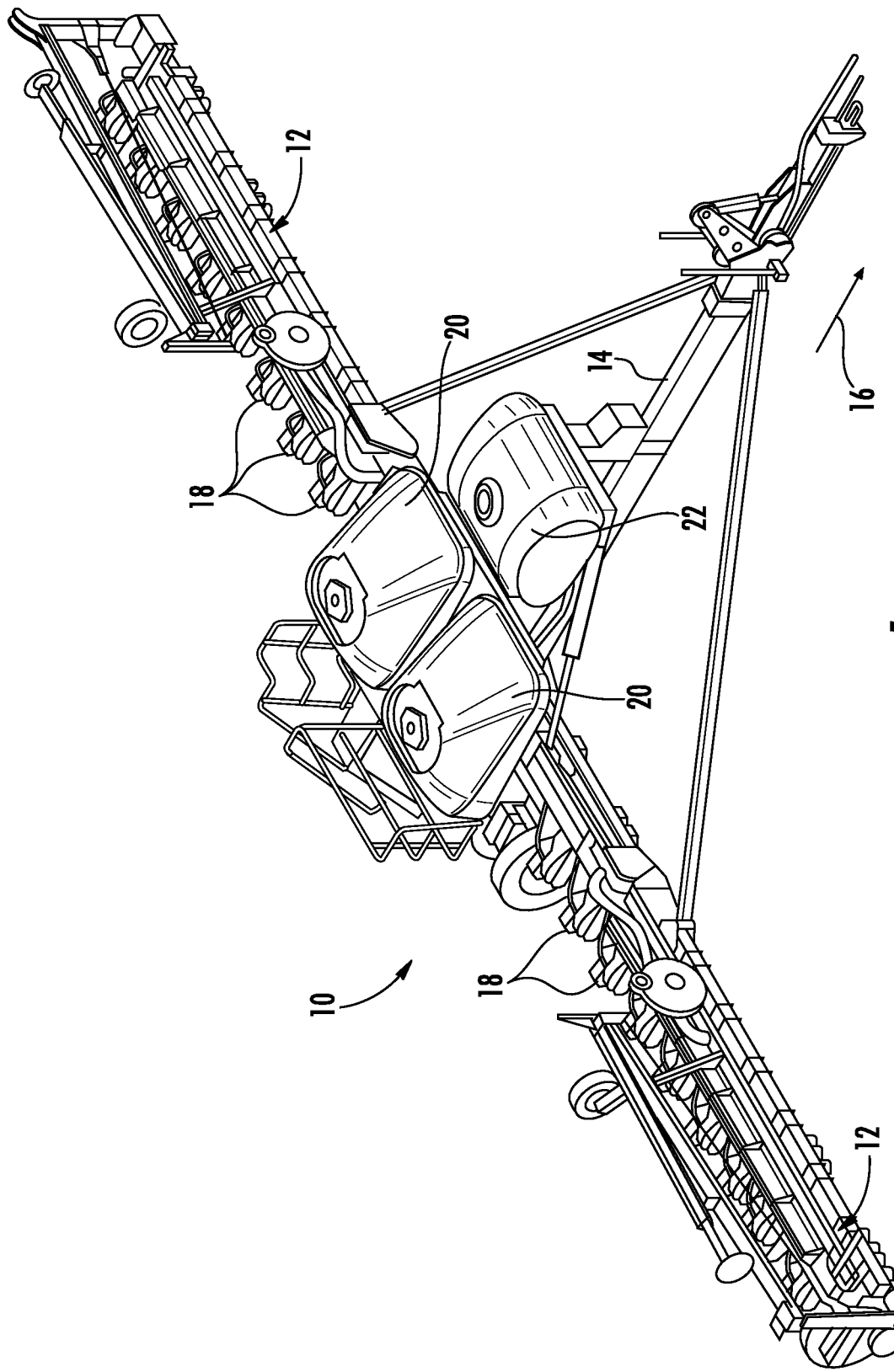
FIG. 1 illustrates a perspective view of one embodiment of a planting implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to wheel assemblies for agricultural implements having sensors integrated or otherwise incorporated therein. Specifically, in several embodiments, a sensor may be positioned within a given wheel assembly of an agricultural implement to allow one or more operating parameters to be monitored that are associated with an agricultural operation being performed using the agricultural implement. For instance, the monitored parameters may include one or more field-related parameters and/or one or more seed placement parameter.

In accordance with aspects of the present subject matter, the disclosed wheel assembly configurations will generally be described with reference to press wheel assemblies configured for use with row units for an agricultural implement, such as a planting or seeding implement. However, it should be appreciated that the disclosed wheel assembly configurations may also be used to incorporate one or more sensors into or within any other suitable wheel assemblies for an agricultural implement, such as a gauge wheel assembly, a ground wheel assembly, and/or the like.

Referring now to drawings, FIG. 1 illustrates a perspective view of one embodiment of a planting implement (e.g., a planter 10) in accordance with aspects of the present subject matter. As shown in FIG. 1, the planter 10 may include a laterally extending toolbar or frame assembly 12 connected at its middle to a forwardly extending tow bar 14 to allow the planter 10 to be towed by a work vehicle (not shown), such as an agricultural tractor, in a direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the planter 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, for purposes of illustration, only a portion of the row units 18 of the planter 10 have been shown in FIG. 1. In general, the planter 10 may include any number of row units 18, such as 6, 8, 12, 16, 24, 32, or 36 row units. In addition, it should be appreciated that the lateral spacing between row units 18 may be selected based on the type of crop being planted. For example, the row units 18 may be spaced approximately 30 inches from one another for planting corn, and approximately 15 inches from one another for planting soy beans.

It should also be appreciated that the configuration of the planter 10 described above and shown in FIG. 1 is provided only to place the present subject matter in an exemplary field of use. Thus, it should be appreciated that the present subject matter may be readily adaptable to any manner of planter configuration or any other planting implement configuration, including seeders.

Figure 2:
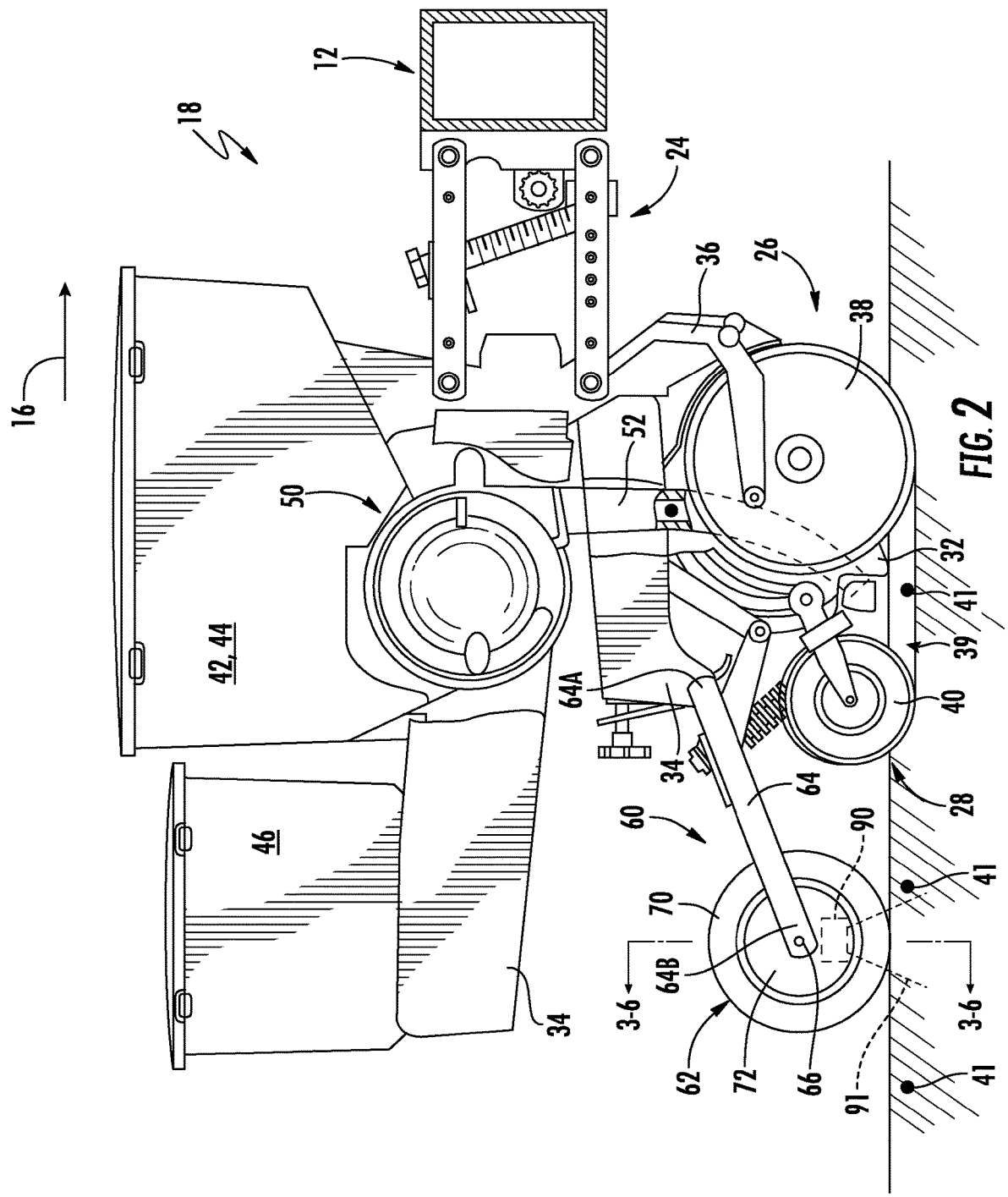
FIG. 2 illustrates a side view of one embodiment of a row unit suitable for use with a planting implement in accordance with aspects of the present subject matter.

Referring now to FIG. 2, a side view of one embodiment of a row unit 18 is illustrated in accordance with aspects of the present subject matter. As shown, the row unit 18 includes a linkage assembly 24 configured to mount the row unit 18 to the toolbar or frame assembly 12 of the planter 10. As shown in FIG. 2, the row unit 18 also includes a furrow opening assembly 26, a furrow closing assembly 28, and a press wheel assembly 60. In general, the furrow opening assembly 26 may include a gauge wheel (not shown) operatively connected to a frame 34 of the row unit 18 via a support arm 36. Additionally, the opening assembly 26 may also include one or more opening disks 38 configured to excavate a trench or furrow 39 in the soil, and a firming point 32. The gauge wheel is not shown to better illustrate the opening disk 38. As is generally understood, the gauge wheel may be configured to engage the surface of the field, with the height of the opening disk(s) 38 being adjusted with respect to the position of the gauge wheel to set the desired depth of the furrow 39 being excavated. Moreover, as shown, the furrow closing assembly 28 may include a closing disk(s) 40 configured to close the furrow 39 after seeds 41 have been deposited therein. The press wheel assembly 60 may then be configured to roll over the closed furrow 39 to firm the soil over the seeds 41 and promote favorable seed-to-soil contact.

As shown in FIG. 2, in several embodiments, the press wheel assembly 60 may generally be configured to include a press wheel 62, one or more wheel support arms 64 (e.g., a pair of support arms) coupled to the frame 34 of the row unit 18 for rotationally supporting the press wheel 62 relative to the ground (and relative to other components of the row unit 18), and optionally an axle 66 defining an axis of rotation 68 (FIG. 3) about which all or a portion of the press wheel 62 is configured to rotate as the press wheel 62 engages the soil. As shown in the illustrated embodiment, each support arm 64 may, for example, extend lengthwise between a first end 64A and a second end 64B, with the first end 64A of the support arm 64 being coupled to a portion of the row unit frame 34 and the second end 64B of the support arm 64 being coupled to the press wheel 62 (e.g., via the axle 66). The press wheel 62, itself, may, in several embodiments, include an outer ground-engaging element 70 (e.g., a rubber ring or tire) that is configured to engage the soil surface and an inner hub 72 positioned radially inwardly relative to the outer ground-engaging element 70. As will be described below, the inner hub 72 may, for example, be configured as a rim (e.g., formed from one or more rim components) extending radially inwardly relative to the outer ground-engaging element 70 or as a bearing-type assembly having inner and outer races (or similar components) for allowing a portion of the press wheel 62 to rotate relative to another portion of the press wheel 62.

Additionally, as shown in FIG. 2, the row unit 18 may include one or more seed hoppers 42 and a fluid tank 46 supported on the frame 34. In general, the seed hopper(s) 42 may be configured to store seeds 41 received from the seed tanks 20 (FIG. 1), which are to be deposited within the furrow 39 as the row unit 18 moves over and across the field. Furthermore, the fluid tank 46 may be configured to store fluid received from the fluid tank 22 (FIG. 1), which is to be sprayed onto the seeds dispensed from the seed hopper(s) 42.

Moreover, the row unit 18 may include a seed meter 50 provided in operative association with the seed hopper(s) 42. In general, the seed meter 50 may be configured to uniformly release seeds 41 received from the seed hopper(s) 42 for deposit within the furrow 39. For instance, in one embodiment, the seed meter 50 may be coupled to a suitable vacuum source (e.g., a blower powered by a motor and associated tubing or hoses) configured to generate a vacuum or negative pressure that attaches the seeds to a rotating seed disk of the seed meter 50, which controls the rate at which the seeds 41 are output from the seed meter 50 to an associated seed tube 52. As shown in FIG. 2, the seed tube 52 may extend vertically from the seed meter 50 toward the ground to facilitate delivery of the seeds 41 output from the seed meter 50 to the furrow 39.

Referring still to FIG. 2, in accordance with aspects with aspects of the present subject matter, one or more sensors 90 may be supported on or within the press wheel assembly 60. Specifically, in several embodiments, one or more sensors 90 may be supported within the press wheel 62 of the wheel assembly 60, such as by being located within an interior volume or cavity of the press wheel 62 (e.g., defined radially inwardly relative to the outer ground-engaging element 70 of the press wheel 62). Such placement of the sensor(s) 90 may, for instance, allow the sensor(s) 90 to detect one or more parameters at a location rearward of the furrow closing assembly 28 (e.g., at the final resting position of the seeds 41 within the soil). For instance, as shown in FIG. 2, in one embodiment, the sensor(s) 90 may be supported within the press wheel 62 such that the sensor(s) has a detection zone or field of view 91 directed towards the soil at a location aft of the furrow closing assembly 28 (e.g., relative to the direction of travel 16 of the planter 10). Moreover, by positioning the sensor(s) 90 within the interior of the press wheel 62, the components of the sensor(s) 90 (e.g., any sensitive electrical components) may be at least partially shielded or protected from rocks, debris, dirt, and/or other potential contaminants and/or foreign objects.

In several embodiments, the sensor(s) 90 may be configured to generate data associated with one or more operating parameters, such as operating parameters that are associated with or impact the performance of an agricultural operation with the field. In one embodiment, the operating parameters may include, but are not limited, one or more field-related parameters, such as soil moisture, soil texture, one or more soil nutrient composition parameters (e.g., organic matter (OM), cation-exchange capacity (CEC), electrical conductivity (EC), and/or the like), and/or any other suitable field conditions, and/or one or more seed placement parameters, such as individual seed depth/position, relative seed spacing, seed population, missing seeds, and/or any other parameters associated with the placement of the deposited seeds 41 within the soil.

In several embodiments, the sensor(s) 90 may correspond to a non-contact sensor having the ability to "see" into or otherwise detect parameters associated with the seedbed environment. For instance, in one embodiment, the sensor(s) 90 may include or correspond to one or more ground penetrating radars, one or more electromagnetic induction (EMI) sensors and/or one or more mmWave-based sensors configured to generate data associated with one or more operating parameters. Such sensing technologies can be used, for example, to detect seeds deposited underneath the soil surface. Moreover, in addition to being able to transmit signals or waves that penetrate through soil, the signals or waves generated by the sensing technologies can also penetrate through one or more portions of the press wheel 62 (e.g., the rubber tire forming the outer ground-engaging element 70 of the press wheel 62). As such, these sensor types and other sensor types like them can be positioned within the interior of the press wheel 62 and "see" through the wheel 62 to the underlying soil and seedbed environment.

In alternative embodiments, the sensor(s) 90 may correspond to any other suitable non-contract sensor, including sensor types that are not configured to "see" through or otherwise penetrate through the press wheel 62 and/or the soil. For instance, in certain embodiments, the sensor(s) 90 may be placed on or within the press wheel 62 such that the sensor(s) 90 has an unobstructed field of view 91 towards the soil surface, such as by configuring the sensor(s) 90 to have a field if view 91 directed through an open side of the interior hub 72 such that the sensor(s) 90 can detect operating conditions associated with the portion of the field adjacent to one side of the press wheel 62.

It should be appreciated that the configurations of the row unit 18 and the associated press wheel assembly 60 described above and shown in FIG. 2 are provided only to place the present subject matter in an exemplary field of use. Thus, it should be appreciated that the present subject matter may be readily adaptable to any manner of row unit configuration and/or press wheel assembly configuration. For instance, as will be described below with reference to FIG. 8, the press wheel assembly 60 shown FIG. 2 may be replaced with a track-based press wheel assembly.

Figure 3:
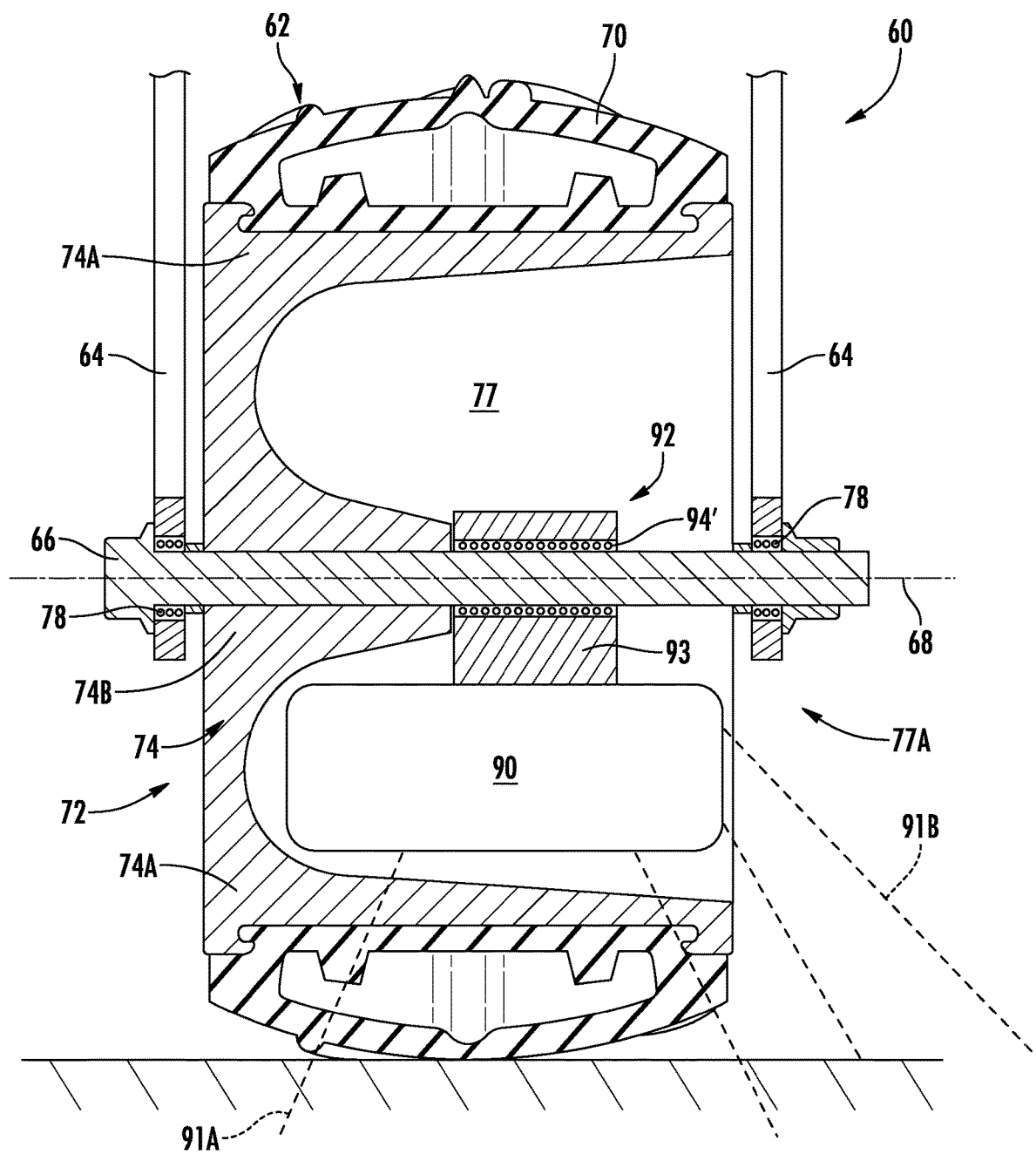
FIG. 3 illustrates a schematic view of one embodiment of a press wheel assembly having an integrated sensor associated therewith in accordance with aspects of the present subject matter.

Referring now to FIG. 3, a schematic view of one embodiment of the press wheel assembly 60 and related sensor(s) 90 described above is illustrated in accordance with aspects of the present subject matter, particularly illustrating a view of the press wheel assembly 60 taken along line 3-6-3-6 in FIG. 2. As described above, the press wheel assembly 60 generally includes a press wheel 62, one or more wheel support arms 64 for rotationally supporting the press wheel 62 relative to the ground (and relative to other components of the row unit 18), and an axle 66 defining an axis of rotation 68 about which all or a portion of the press wheel 62 is configured to rotate, with the press wheel 62 including an outer ground-engaging element 70 and an inner hub 72 extending radially inwardly from the outer ground-engaging element 70. In the illustrated embodiment, the outer ground-engaging element 70 is shown as being configured as an inflatable tire. However, in other embodiments, outer ground-engaging element 70 may correspond to any other suitable component configured to engage the ground, such as a solid or non-inflatable, annular rubber element or an endless track.

Additionally, as shown in the illustrated embodiment, the inner hub 72 is configured as a rim including a rim component 74 extending radially within an internal volume or cavity 77 of the press wheel 62 (e.g., defined radially inwardly relative to the outer ground-engaging element 70) between a radially outer end 74A and a radially inner end 74B, with the radially outer end 74A of the rim component 74 being coupled to the outer ground-engaging element 70 and the radially inner end 74B of the rim component 74 being coupled to the axle 66 for rotation therewith. Thus, as the outer ground-engaging element 70 engages the soil surface, the press wheel 62 (including the outer ground-engaging element 70 and the inner hub 72) will rotate with the axle 66 about the axis of rotation 68. In the illustrated embodiment, the rim component 74 is offset to one side of the press wheel's internal cavity 77 such that the opposed side of the internal cavity 77 is open to the exterior (e.g., open side 77A shown in FIG. 3). This open side 77A of the press wheel 62 may be used, for example, to route cabling to the sensor(s) 90 positioned within the press wheel 62 and/or to allow the sensor(s) 90 to have an unobstructed field of view out the side of the press wheel 62. Moreover, the offset nature of the rim component 74 (along with its configuration and shape) provides a significant amount of open area within the internal cavity 77 for accommodating the sensor(s) 90 and related components.

As shown in FIG. 3, the sensor(s) 90 is supported within the internal cavity 77 of the press wheel 62 such that the sensor(s) 90 has a field of view directed towards the soil. In embodiments in which the sensor(s) 90 is configured to generate signals or waves that penetrate through the press wheel 62 to detect one or more operating parameters (e.g., field-related parameters and/or seed placement parameters) associated with ground directly underneath the press wheel 62, the field of view may be directed downwardly through the adjacent portion of the press wheel 62 (e.g., field of view 91A shown in FIG. 3). Alternatively, in embodiments in which the sensor(s) 90 is not configured to penetrate through the press wheel 62, the field of view may be directed laterally through the open side 77A of the press wheel 62 (e.g., field of view 91B shown in FIG. 3).

In several embodiments, the sensor(s) 90 may be configured to be supported within the press wheel 62 such that the sensor(s) 90 remains stationary or otherwise does not rotate with the rotating components of the press wheel 62, thereby allowing the sensor(s) 90 to maintain a constant field of view directed towards the soil. For instance, in the illustrated embodiment, the sensor(s) 90 is supported within the internal cavity 77 of the press wheel 62 via a swivel mount 92 coupled to the axle 66. Specifically, the swivel mount 92 may include a mounting arm or bracket 93 for supporting the sensor(s) 90 and a mount bearing 94 coupled between the mounting bracket 93 and the axle 66 for allowing the axle 66 to rotate relative to the mounting bracket 93 (and, thus, the sensor(s) 90). For instance, the mount bearing 94 may include an inner race (not shown) coupled to the axle 66 for rotation therewith and an outer race (not shown) coupled to the mounting bracket 93. Thus, as the press wheel 62 and axle 66 rotate together as the press wheel 62 engages the ground during the performance of a planting or seeding operation, the sensor(s) 90 can remain stationary or relative stationary (e.g., in a non-rotating state) to allow the sensor(s) 90 to capture data associated with one or more operating parameters (e.g., one or more field-related parameters and/or seed placement parameters).

Figure 4:
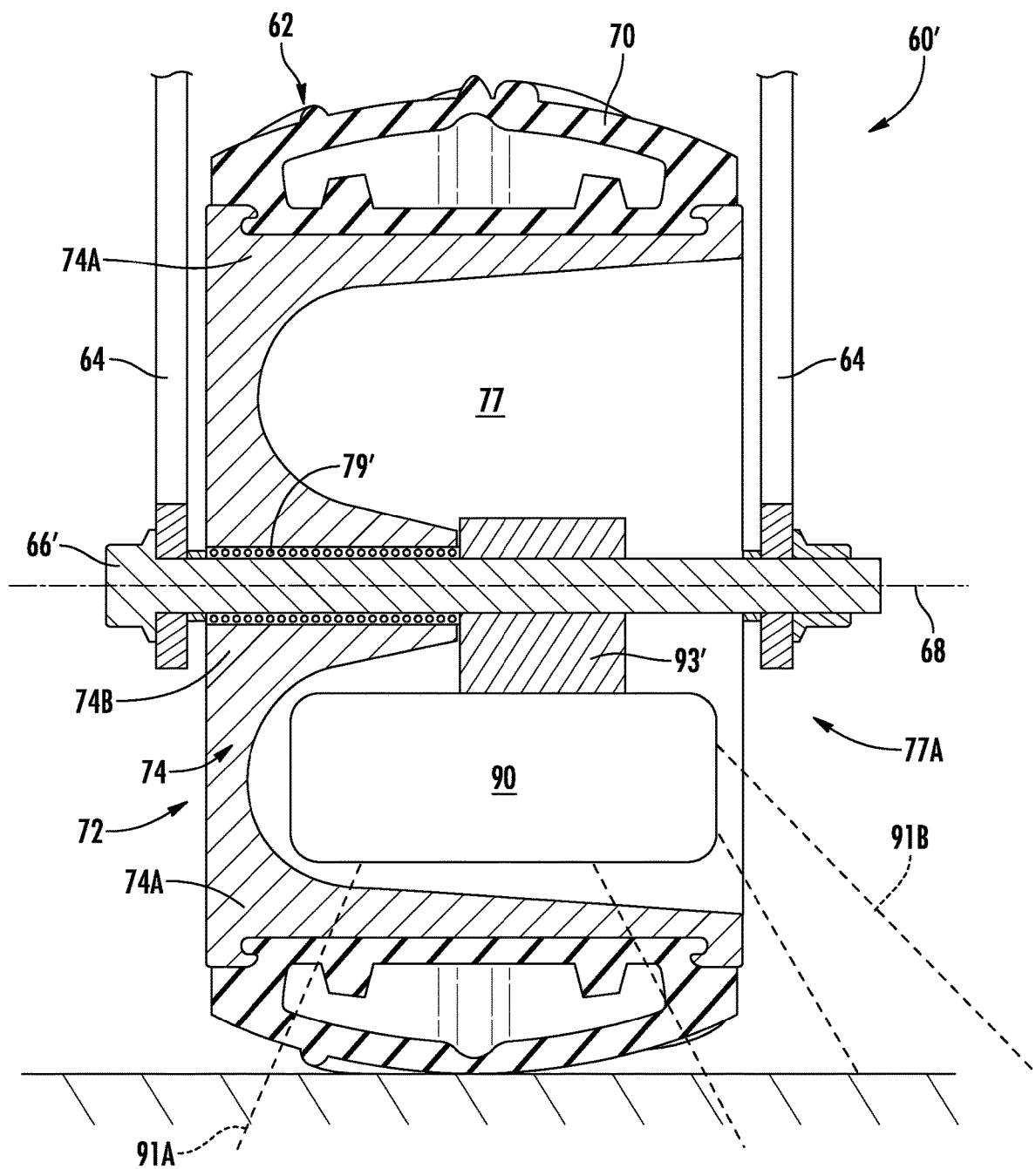
FIG. 4 illustrates a schematic view of another embodiment of a press wheel assembly having an integrated sensor associated therewith in accordance with aspects of the present subject matter.

Referring now to FIG. 4, a schematic view of another embodiment of the press wheel assembly 60' and related sensor(s) 90 described above is illustrated in accordance with aspects of the present subject matter, particularly illustrating a view of the press wheel assembly 60' taken along line 3-6-3-6 in FIG. 2. In general, the embodiment shown in FIG. 4 is the same as the embodiment shown in FIG. 3 except that the axle 66' is configured as a fixed or non-rotating component of the press wheel assembly 60'. Specifically, in the embodiment described above with reference to FIG. 3, the axle 66 is coupled to the mounting arms 64 of the press wheel assembly 60 (e.g., via bearings 78) such that the axle 66 rotates relative to the mounting arms 64 together with the press wheel 62. However, in the embodiment shown in FIG. 4, the axle 66' is fixedly or non-rotatably coupled to the mounting arms 64. In such an embodiment, as shown in FIG. 4, a hub bearing 79' may be provided between the non-rotating axle 66' and the inner hub 72 to allow the press wheel 62 to rotate relative to the axle 66'. Moreover, since the axle 66' is fixed, the sensor(s) 90 may be coupled to the axle 66' without requiring a swivel mount. For instance, as shown in FIG. 4, a mounting arm or bracket 94' may be coupled directly between the axle 66' and the sensor(s) 90 to support the sensor(s) 90 within the internal cavity 77 of the press wheel 62 in a manner that maintains the sensor(s) 90 stationary or non-rotating relative to the rotating components of the press wheel 62. Alternatively, the sensor(s) 90 may be coupled to the axle 66' using a swivel mount, such as the swivel mount 92 described above with reference to FIG. 3.

Figure 5:
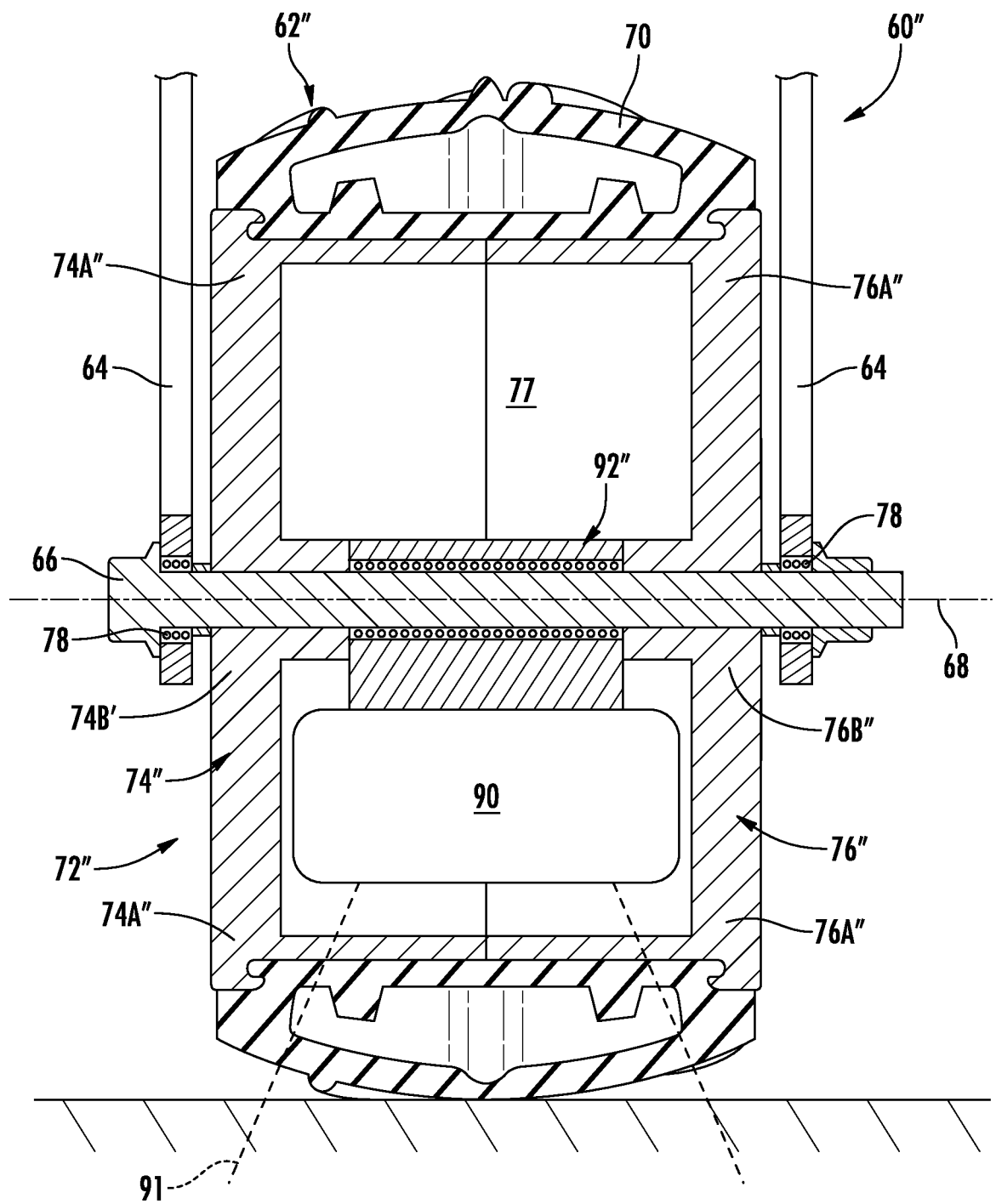
FIG. 5 illustrates a schematic view of a further embodiment of a press wheel assembly having an integrated sensor associated therewith in accordance with aspects of the present subject matter.

Referring now to FIG. 5, a schematic view of a further embodiment of the press wheel assembly 60" and related sensor(s) 90 described above is illustrated in accordance with aspects of the present subject matter, particularly illustrating a view of the press wheel assembly 60" taken along line 3-6-3-6 in FIG. 2. In general, the embodiment of FIG. 5 is configured similar to the embodiment described above with reference to FIG. 3. As such, the press wheel assembly 60" generally includes a press wheel 62", one or more wheel support arms 64 for rotationally supporting the press wheel 62" relative to the ground (and relative to other components of the row unit 18), and an axle 66 defining an axis of rotation 68 about which all or a portion of the press wheel 62" is configured rotate, with the press wheel 62" including an outer ground-engaging element 70 and an inner hub 72" extending radially inwardly from the outer ground-engaging element 70 and being coupled to the axle 66.

However, unlike the embodiment described above, the inner hub 72" is configured as a rim assembly including first and second rim components 74", 76" extending radially within the internal volume or cavity 77 of the press wheel 62". Specifically, the first rim component 74" generally extends radially along a first side of the press wheel 62 between a radially outer end 74A" and a radially inner end 74B", with the radially outer end 74A" of the first rim component 74" being coupled to the outer ground-engaging element 70 and the radially inner end 74B" of the first rim component 74" being coupled to the axle 66 for rotation therewith. Similarly, the second rim component 76" generally extends radially along an opposed second side of the press wheel 62" between a radially outer end 76A" and a radially inner end 76B", with the radially outer end 76A" of the second rim component 76" being coupled to the outer ground-engaging element 70 and the radially inner end 76B" of the second rim component 76B" being coupled to the axle 66 for rotation therewith. As such, unlike the embodiment described above in which the internal cavity is open-ended along one side of the press wheel, the internal cavity 77 is closed or substantially closed, thereby reducing the likelihood of rocks, debris, soil, and/or other contaminates and/or foreign objects entering the internal cavity 77 and potentially damaging and/or soiling the sensor(s) 90.

As shown in FIG. 5, the sensor(s) 90 may be supported within the internal cavity 77 between the first and second rim components 74", 76" in the same or a similar manner as described above. For instance, in the illustrated embodiment, the sensor(s) 90 is supported within the internal cavity 77 relative to the axle 66 via a swivel mount 92", thereby allowing the sensor(s) 90 to maintain a constant field of view 91 directed towards the soil as the press wheel 62" and axle 66 rotate relative thereto. Alternatively, if the axle 66 is configured as a fixed or non-rotating axle, the sensor(s) 90 may be coupled to the axle 66, for example, via a non-swivel or rigid-type mount, such as the mounting bracket 93' described above with reference to FIG. 4. In such an embodiment, the rim components 74", 76" may be coupled to the axle 66 via suitable bearings to allow the press wheel 62" to rotate relative to the axle 66 about the axis of rotation 68.

Figure 6:
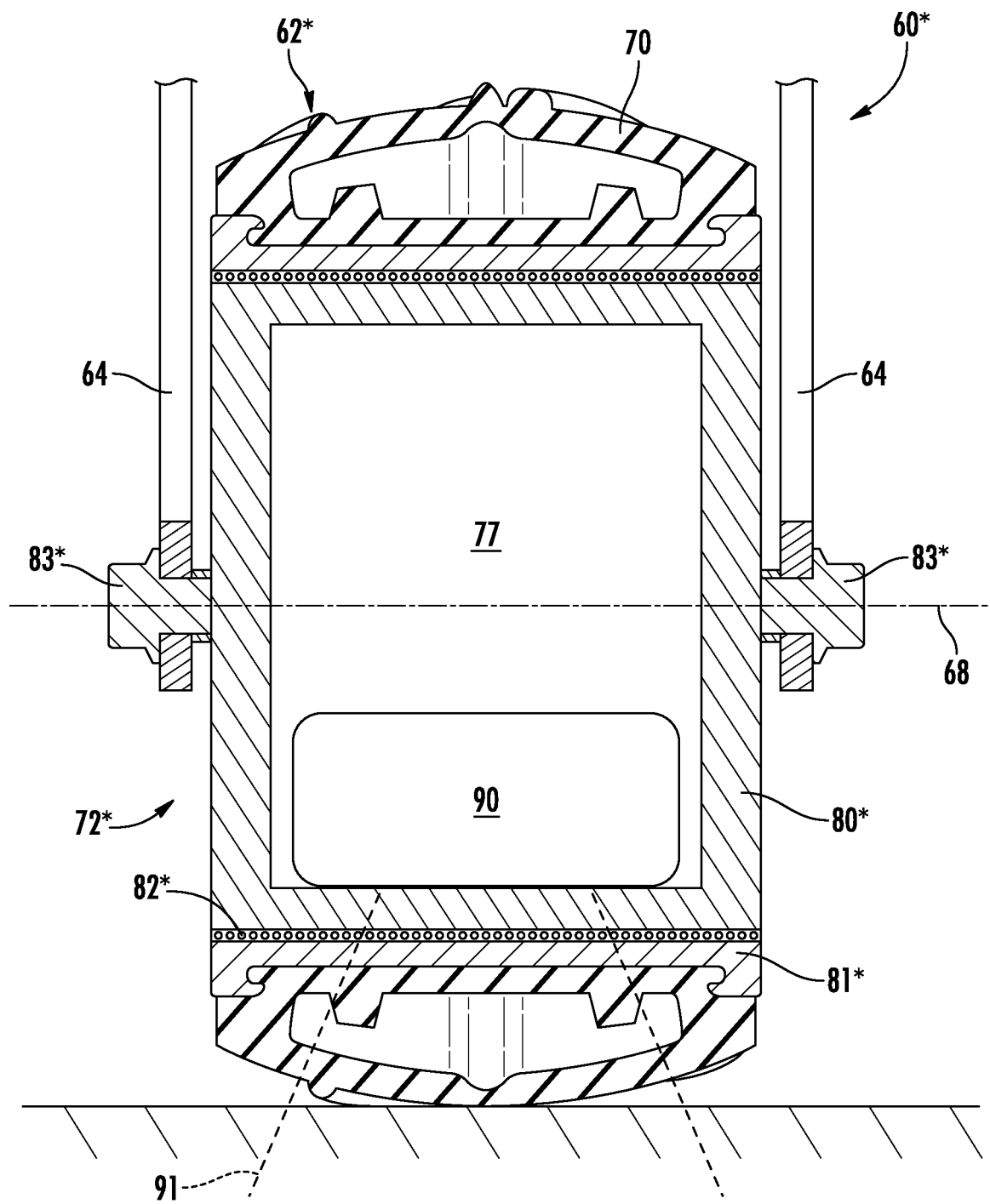
FIG. 6 illustrates a schematic view of yet another embodiment of a press wheel assembly having an integrated sensor associated therewith in accordance with aspects of the present subject matter.

Referring now to FIG. 6, a schematic view of a further embodiment of the press wheel assembly 60* and related sensor(s) 90 described above is illustrated in accordance with aspects of the present subject matter, particularly illustrating a view of the press wheel assembly 60* as taken along line 3-6-3-6 in FIG. 2. In general, the embodiment of FIG. 6 is configured similar to the embodiment described above with reference to FIG. 3. As such, the press wheel assembly 60* generally includes a press wheel 62* and one or more wheel support arms 64 for rotationally supporting the press wheel 62* relative to the ground (and relative to other components of the row unit 18), with the press wheel 62* including an outer ground-engaging element 70 and an inner hub 72* extending radially inwardly from the outer ground-engaging element 70.

However, unlike the embodiment described above, the press wheel assembly 60* does not include an axle extending through the press wheel 62* along the axis of rotation 68 of the wheel 62*. Rather, as shown in FIG. 6, the inner hub 72* is configured as a bearing assembly including an inner race 80* rigidly coupled to the mounting arms 64 (e.g., via bolts or other suitable fasteners 83*), an outer race 81* coupled to the outer ground-engaging element 70, and, optionally, a plurality of bearing elements 82* (e.g., balls or rollers) positioned between the inner and outer races 80*, 81*. In such an embodiment, the outer race 81* (and, thus, the outer ground-engaging element 70) may be configured to rotate relative to the fixed inner race 80* about the axis of rotation 68. As such, a radially inner portion of the inner hub 72* corresponds to a fixed or non-rotating component (i.e., the inner race 80*) while a radially outer portion of the inner hub 72* corresponds to a rotating component (i.e., the outer race 81*).

Additionally, as shown in FIG. 6, the sensor(s) 90 may, in several embodiments, be supported within an internal cavity 77 of the press wheel 62* defined by the inner race 80*. Specifically, since the inner race 80* corresponds to a non-rotating component, the sensor(s) 90 may be directly or indirectly mounted to a portion of the inner race 80*, such as by mounting the sensor(s) 90 to an interior wall of the inner race 80* (e.g., at the bottom of the cavity 77). As a result, the sensor(s) 90 may maintain a constant field of view 91 directed towards the soil as the outer race 81* of the inner hub 72* and the outer ground-engaging element 70 rotate relative to both the inner race 80* of the inner hub 72* and the sensor(s) 90.

Figure 7:
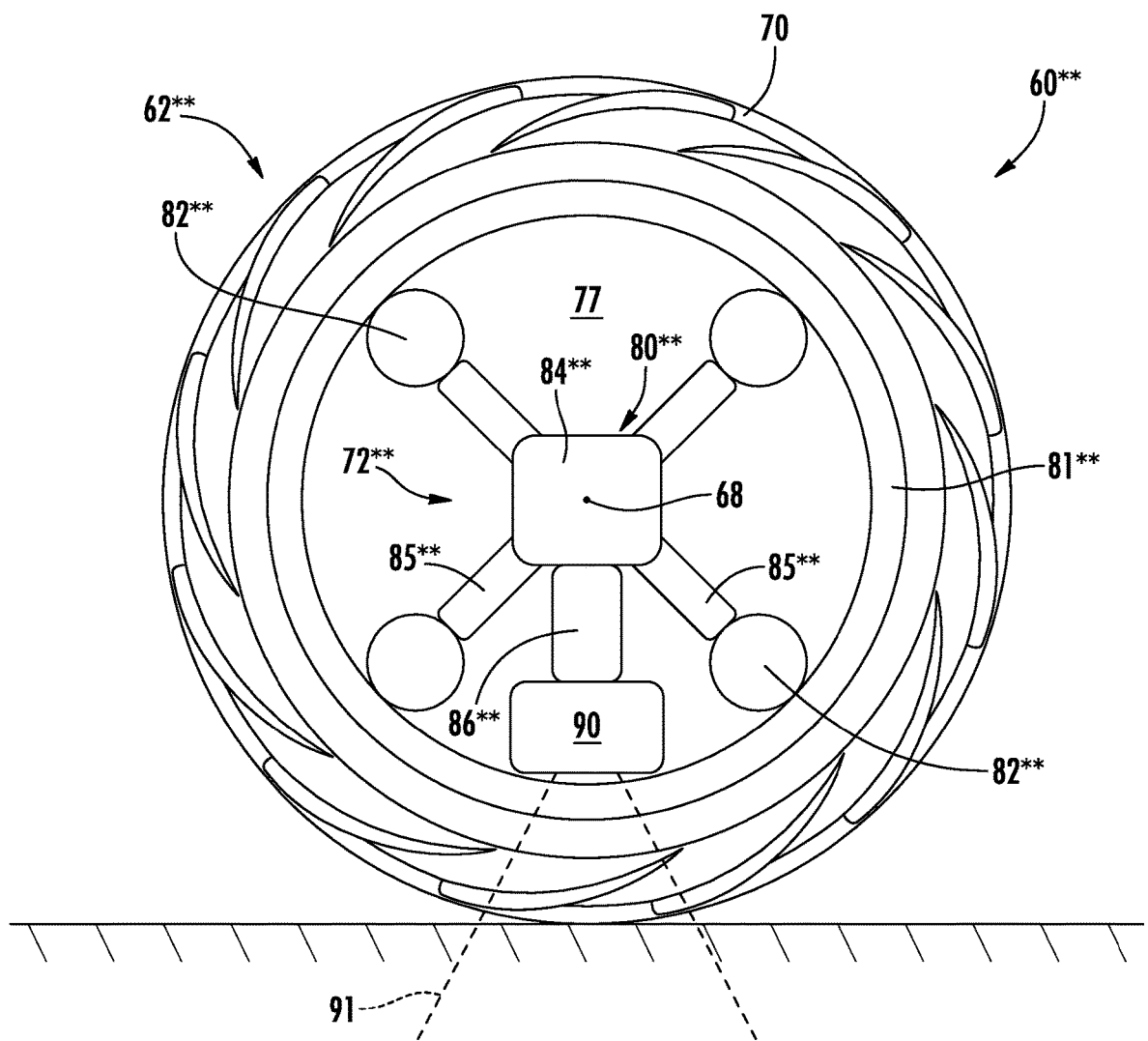
FIG. 7 illustrates a schematic view of an additional embodiment of a press wheel assembly having an integrated sensor associated therewith in accordance with aspects of the present subject matter.

Referring now to FIG. 7, a schematic, side view of a further embodiment of the press wheel assembly 60 and related sensor(s) 90 described above is illustrated in accordance with aspects of the present subject matter. In general, the embodiment of FIG. 7 is configured similar to the embodiment described above with reference to FIG. 6. As such, the press wheel assembly 60 generally includes a press wheel 62 and one or more wheel support arms (not shown) for rotationally supporting the press wheel 62 relative to the ground (and relative to other components of the row unit 18), with the press wheel 62 including an outer ground-engaging element 70 and an inner hub 72 extending radially inwardly from the outer ground-engaging element 70.

Additionally, similar to the embodiment described above with reference to FIG. 6, the press wheel assembly 60 does not include an axle extending through the press wheel 62 along the axis of rotation 68 of the press wheel 62. Rather, as shown in FIG. 7, the inner hub 72 is configured as a bearing-like assembly having an inner, non-rotating hub component fixedly coupled to the mounting arms (not shown) of the press wheel assembly 60 and an outer, rotating hub component coupled to the outer ground-engaging element 70. Specifically, in the illustrated embodiment, the inner hub 72 comprises a fixed or non-rotating inner race or frame 80 supporting a plurality of bearing elements 82 (e.g., balls or rollers) and a rotating outer race 81 supported radially by the bearing elements 82 for rotation relative to the inner frame 80. As shown in FIG. 7, the inner frame 80 may include a central frame member 84 and a plurality of circumferentially spaced support arms 85 extending radially outwardly from the central frame member 84, with each support arm 85 supporting a respective bearing element 82 of the inner hub 72 relative to the outer race 81**.

As a result of such a configuration, the sensor(s) 90 may be coupled to the inner frame 80 (and, thus, non-rotationally supported within the internal cavity 77 of the press wheel 62) without requiring the field of view 91 of the sensor(s) 90 to be directed through a non-rotating component of the press wheel 62. Specifically, unlike the embodiment described above with reference to FIG. 6 in which the field of view of the sensor(s) 90 is directed through the non-rotating inner race of the inner hub, the sensor(s) 90 can be coupled to the inner frame 80 (e.g., via a mounting bracket 86) such that the sensor(s) 90 is supported between (and/or has a field of view 91 directed between) adjacent support arms 85 of the inner frame 80. Accordingly, with a field of view 91 directly downwardly towards the soil underlying the press wheel 62, the sensor(s) 90 would only need to penetrate through the outer race 81 and the outer ground-engaging element 70. It should also be appreciated that the inner hub configuration shown in FIG. 7 may permit the interior cavity 77 of the press wheel 62 to be open-ended along one or both of the sides of the wheel 62**, thereby allowing the sensor(s) 90 to include a field of view directed through the open end(s) of the cavity 77 (e.g., similar to the embodiment described above with reference to FIG. 3).

Figure 8:
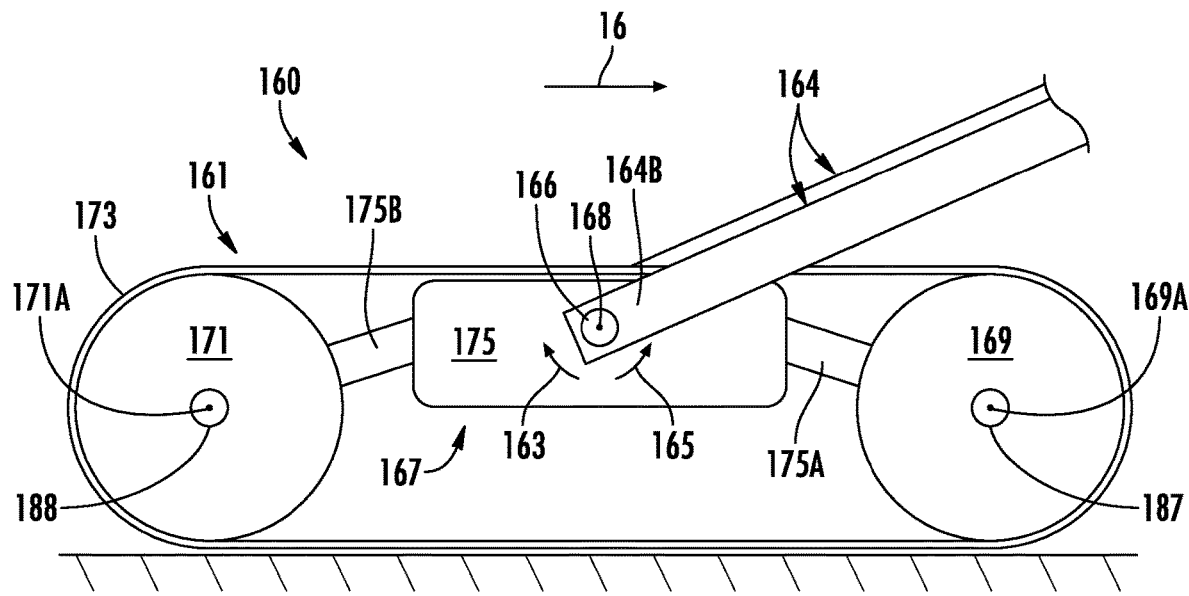
FIG. 8 illustrates a schematic view of one embodiment of a track-based press wheel assembly configured for use with a row unit for an agricultural implement in accordance with aspects of the present subject matter.

Referring now to FIG. 8, a side view of one embodiment of a track-based press wheel assembly 160 configured for use with a row unit of an agricultural implement (e.g., a planting implement) is illustrated in accordance with aspects of the present subject matter. Specifically, the track-based press assembly 160 shown in FIG. 8 may be used as an alternative to the type of press wheel assembly 60 described above, for example, with reference to FIG. 2. For instance, the track-based press wheel assembly 160 may be coupled to the frame 34 of the row unit 18 in a manner similar to the press wheel assembly 60 described above such that the track-based press wheel assembly 162 is positioned aft of the furrow closing assembly 28 of the row unit 18. As such, the track-based press wheel assembly 160 may generally be configured to roll over the closed furrow 39 to firm the soil over the seeds 41 and promote favorable seed-to-soil contact.

As shown in FIG. 8, the track-based press wheel assembly 160 may generally be configured to include a track assembly 161, one or more wheel support arms 164 (e.g., a pair of support arms) configured to be coupled to the frame 34 of the row unit 18 for supporting the track assembly 161 relative to the ground (and relative to other components of the row unit 18), and an axle 166 defining a pivot axis 168 about which the track assembly 161 is configured to pivot relative to the support arms 164 (e.g., in a first pivot direction indicated by arrow 163 and an opposed second pivot direction indicated by arrow 165). In several embodiments, each wheel support arm 164 may extend lengthwise between a first end (not shown) and a second end 164B, with the first end of each support arm 164 being coupled to the frame 34 of the row unit 18 (e.g., in the same manner that the second ends 64B of the support arms 64 of the press wheel assembly 60 shown in FIG. 2 are coupled to the frame 34) and the second end 164B of each support arm 164 being coupled to the axle 166. Additionally, in one embodiment, the axle 166 may be configured as a rotating axle (e.g., by being coupled to the support arms 164 via bearings) such that both the axle 166 and the track assembly 161 are pivotable relative to the support arms 164 about the pivot axis 168. Alternatively, the axle 166 may be configured as a fixed or non-rotating axle (e.g., by being fixedly coupled to the support arms 164) such that the track assembly 161 is pivotable relative to the axle 166 and the support arms 164 about the pivot axis 168. In such an embodiment, the track assembly 161 may, for instance, be coupled to the axle 166 via one or more bearings to allow for such relative pivoting between the track assembly 161 and axle 166. Regardless, by allowing the track assembly 161 to pivot about the pivot axis 168 (whether with or relative to the axle 166), such pivotability may allow the track assembly 161 to follow the contour of the ground surface, such as when the track assembly 161 is transitioning to a sloped surface or otherwise encounters variations in the surface profile of the ground.

In several embodiments, the track assembly 161 may generally include a track frame 167, first and second press wheels 169, 171 supported by the track frame 167 for rotation about respective axes of rotation 169A, 171A, and an outer ground-engaging element in the form of a track 173 extending or wrapping in an endless loop around the first and second press wheels 169, 171. As shown in FIG. 8, the track frame 167 includes a main support beam 175 configured to be coupled to the axle 166, such as by either fixedly coupling the main support beam 175 to the axle 166 when the axle 166 is configured rotate about the pivot axis 168 or by rotationally coupling the main support beam 175 to the axle 166 (e.g., via bearings) when the axle 166 is configured as a non-rotating component. Additionally, the track frame 167 includes first and second support beams 175A, 175B coupled to and extending outwardly from the main support beam 175, with the first support beam 175A extending forwardly (e.g., relative to the travel direction 16 of the implement 10) from the support beam 175 to allow the first support beam 175A to rotationally support the forward or first press wheel 169 and the second support beam 175B extending rearwardly (e.g., relative to the travel direction 16 of the implement) from the support beam 175 to allow the second support beam 175B to rotationally support the rear or second press wheel 171. For instance, the first support beam 175A may extend outwardly from the main support beam 175 and be coupled to a first axle 187 defining the rotational axis 169A about which the first press wheel 169 is configured to rotate. Similarly, the second support beam 175B may extend outwardly from the main support beam 175 and be coupled to a second axle 188 defining the rotational axis 171A about which the second press wheel 171 is configured to rotate.

It should be appreciated that the track assembly 161 is generally configured as a passive or friction-based track assembly in which rotation of the press wheels 169, 171 is driven by the track 173. Specifically, as the track-based press wheel assembly 160 is moved or pulled across the ground with movement of the associated agricultural implement across the field, the engagement or friction between the track 173 and the ground will cause the track 173 to move in a looped, which will, in turn, cause the press wheels 169, 171 to rotate about their respective axes of rotation 169A, 171A.

Figure 9:
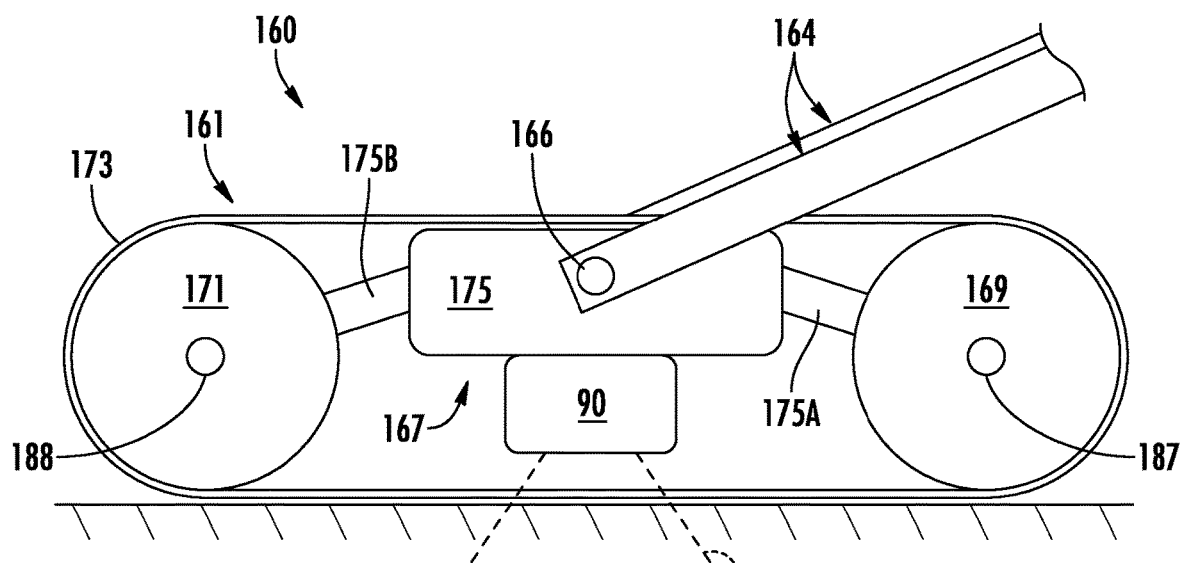
FIG. 9 illustrates another schematic view of the track-based press wheel assembly shown in FIG. 8, particularly illustrating the press wheel assembly having an integrated sensor associated therewith in accordance with aspects of the present subject matter.

Additionally, in several embodiments, the track-based press wheel assembly 160 may be configured to include one or more integrated sensors in a manner similar to the various embodiments described above with reference to FIGS. 2-7. For instance, FIG. 9 illustrates another schematic view of the track-based press wheel assembly 160 shown in FIG. 8, particularly illustrating the assembly 160 including one or more sensors 90 supported therein. Specifically, as shown in FIG. 9, the sensor(s) 90 may be supported within the interior of the track assembly 161, such as by being located within an interior volume or cavity 177 of the track assembly 161 (e.g., the cavity defined radially inwardly from the track 173). In one embodiment, the sensor(s) 90 may be coupled to a portion of the track frame 167 (e.g., a portion of the main support beam 175). In general, the sensor(s) 90 may be configured to be supported within the track assembly 161 such that the sensor(s) 90 has a detection zone or field of view directed towards the soil at a location aft of the furrow closing assembly 28 (FIG. 2) (e.g., relative to the direction of travel 16 of the planter 10). For instance, in the illustrated embodiment, the sensor(s) 90 has a field of view 91 directed downwardly towards the soil underling the track assembly 161. However, in other embodiments, the sensor(s) 90 may have a field of view directed outwardly or laterally towards one of the open sides of the track assembly 161.

It should be appreciated that the sensor(s) 90 may generally be configured the same as or similar to the sensor(s) embodiments described above. For instance, in several embodiments, the sensor(s) 90 may be configured to generate data associated with one or more operating parameters, including one or more field-related parameters and/or one or more seed placement parameters, such as soil moisture, soil texture, one or more soil nutrient composition parameters (e.g., organic matter (OM), cation-exchange capacity (CEC), electrical conductivity (EC), and/or the like), individual seed depth/position, relative seed spacing, seed population, missing seeds, and/or any suitable field conditions and/or seed placement parameters. Additionally, in several embodiments, the sensor(s) 90 may correspond to a non-contact sensor, such as a non-contact sensor having the ability to "see" into or otherwise detect parameters associated with the seedbed environment. For instance, in one embodiment, the sensor(s) 90 may include or correspond to one or more ground penetrating radars, one or more electromagnetic induction (EMI) sensors and/or one or more mmWave-based sensors configured to transmit signals or waves that penetrate through one or more components of the track assembly 161 (e.g., the track 173) to allow the sensor(s) 90 to detect one or more operating parameters.

Figure 10:
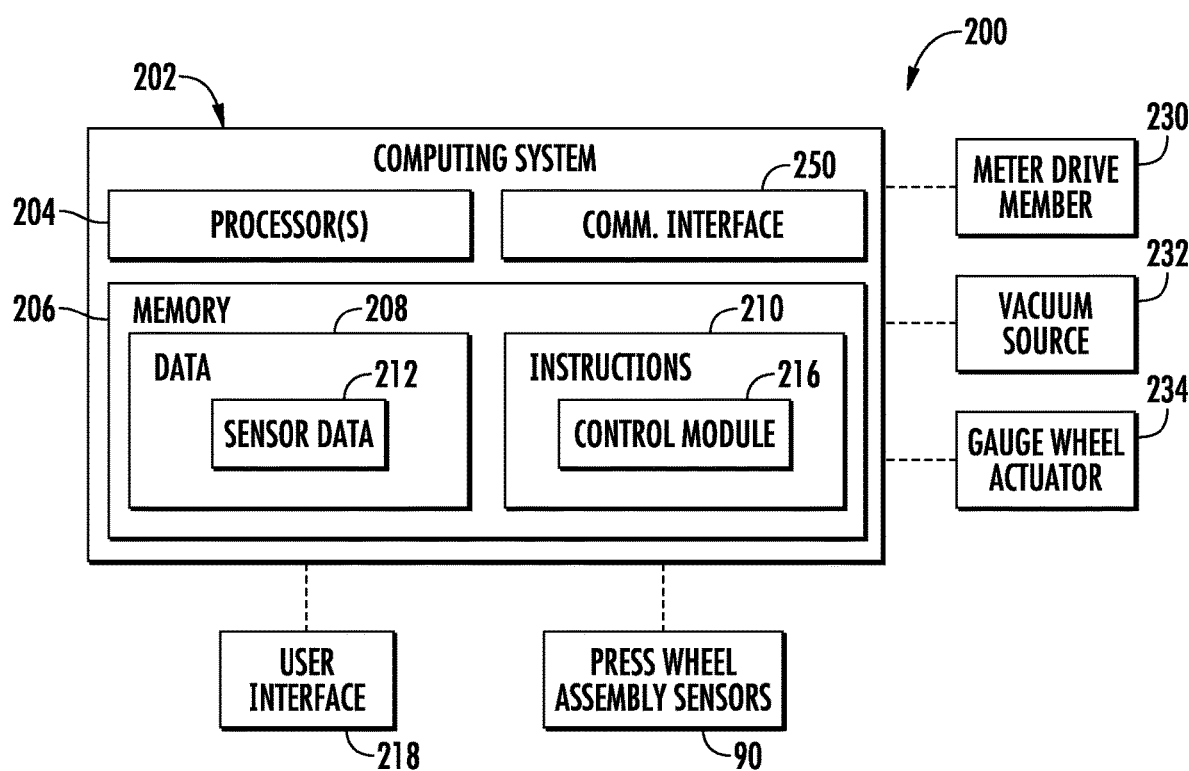
FIG. 10 illustrates a schematic view of one embodiment of a system for monitoring operating parameters during the performance of an agricultural operation in accordance with aspects of the present subject matter.

Referring now to FIG. 10, a schematic view of one embodiment of a system 200 for monitoring operating parameters during the performance of an agricultural operation is illustrated in accordance with aspects of the present subject matter. In general, the system 200 will be described herein with reference to the planting implement 10, the row unit 18, the press wheel assemblies 60, 160 and related components described above with reference to FIGS. 1-9. However, it should be appreciated that the disclosed system 200 may generally be utilized with any planter or seeder having any suitable implement configuration, with row units having any suitable row unit configuration, and/or with press wheel assemblies having any other suitable assembly configuration.

In several embodiments, the system 200 may include a computing system 202 and various other components configured to be communicatively coupled to and/or controlled by the computing system 202, such as a meter drive member 230 configured to rotationally drive the seed meter 50, a vacuum source 232 configured to apply a vacuum or negative pressure to the seed disk or seed transport member of the seed meter 50, a gauge wheel actuator 234 configured to actuate the gauge wheel of the row unit 18 to adjust the current planting depth, and/or various sensors configured to monitor one or more operating parameters associated with each row unit 18. For example, the computing system 202 may be communicatively coupled to one or more sensors integrated or otherwise incorporated into the press wheel assembly 60, 160 of each row unit 18, such as one or more of the sensors 90 described above It should be appreciated that the computing system 202 may correspond to any suitable processor-based device(s), such as a computing device or any combination of computing devices. Thus, as shown in FIG. 10, the computing system 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204. In one embodiment, the data 208 may be stored in one or more databases, such as a sensor database 212 for storing data received from the sensor(s) 90 that is associated with one or more of the monitored operating parameters, such as one or more field-related parameter and/or one or more seed placement parameters.

In several embodiments, the instructions 210 stored within the memory 206 of the computing system 202 may be executed by the processor(s) 204 to implement a control module 216. In general, the control module 216 may be configured to initiate a control action based on the operating parameter(s) determined using the data generated by the sensor(s) 90. For instance, in one embodiment, the control module 216 may be configured to provide a notification to the operator indicating the determined operating parameter(s). For instance, in one embodiment, the control module may cause a visual or audible notification or indicator to be presented to the operator via an associated user interface 218 provided within the cab of the vehicle used to tow the planting implement 10.

In other embodiments, the control module 2216 may be configured to execute an automated control action designed to adjust the operation of the row unit 18 or the planting implement 10. For instance, in one embodiment, the computing system 202 may be configured to automatically adjust the depth of the furrow being cut into the soil (e.g., by adjusting the relative position of the gauge wheel and opening assembly 26 via control of the gauge wheel actuator 234) based on operating parameter data associated with the current depth at which the seeds are being planted. Similarly, in one embodiment, the computing system 202 may be configured to automatically adjust the operation of the seed meter 50 to vary the rate at which seeds are being deposited within the soil based on operating parameter data associated with the current seed spacing and/or seed population. For instance, the computing system 202 may be configured to increase or decrease the speed at which the seed disc of the seed meter 50 is being rotated (e.g., via control of the meter drive member 230) if it is determined that the seed spacing needs to be adjusted relative to a target seed spacing range. Similarly, the computing system 202 may be configured to increase or decrease the vacuum pressure applied to the seed meter 50 (e.g., via control of the vacuum source 232) if it is determined that the current seed population is too low or too high relative to a target seed population range. As another example, the detection of missing seeds may be indicative of plugging or issues with the closing system. In such instances, the computing system 202 may be configured to automatically adjust the operation of the row unit 18 and/or the planting implement 10 to address issues related to plugging/closing.

Moreover, as shown in FIG. 10, the computing system 202 may also include a communications interface 250 to provide a means for the computing system 202 to communicate with any of the various other system components described herein. For instance, one or more communicative links or interfaces (e.g., one or more data buses) may be provided between the communications interface 250 and the meter drive member 230, the vacuum source 232, and the gauge wheel actuator 234 to allow the computing system 202 to transmit control signals for controlling the operation of such components. Similarly, one or more communicative links or interfaces (e.g., one or more data buses) may be provided between the communications interface 250 and the sensor(s) 90 to allow the associated sensor data to be transmitted to the computing system 202.

It should be appreciated that, in general, the computing system 202 may include any suitable computing device(s) that is configured to function as described herein. In several embodiments, the computing system 202 may form part of an active planting system configured to perform a planting operation, such as by including a vehicle controller of a work vehicle configured to tow an associated planting implement 10 and/or an associated implement controller of the planting implement 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A row unit configured for use with an agricultural implement, the row unit comprising:
    a frame;
    a furrow opening assembly supported relative to the frame and being configured to create a furrow in soil;
    a furrow closing assembly supported relative to the frame and being configured to close the furrow formed in the soil;
    a press wheel supported relative to the frame and being configured to move over the closed furrow; and
    a sensor supported within the press wheel, wherein the sensor has a field of view directed through a portion of the press wheel.

2. The row unit of claim 1, wherein the sensor is configured to generate data indicative of one or more operating parameters associated with an agricultural operation being performed by the row unit.

3. The row unit of claim 2, wherein the one or more operating parameters comprises at least one of a field-related parameter or a seed placement parameter.

4. The row unit of claim 1, wherein the press wheel defines an internal cavity, the sensor being positioned within the internal cavity of the press wheel.

5. The row unit of claim 1, wherein the press wheel comprises an outer ground-engaging element and an inner hub extending radially inwardly from the outer ground-engaging element, the sensor being positioned within an internal cavity of the press wheel defined radially inwardly relative to the outer ground-engaging element.

6. The row unit of claim 5, further comprising an axle extending axially along an axis of rotation of the press wheel, the sensor being coupled to the axle.

7. The row unit of claim 6, wherein the axle is configured to rotate with the inner hub about the axis of rotation as the press wheel moves over the closed furrow, the sensor being coupled to the axle such that the axle is configured to rotate relative to the sensor.

8. The row unit of claim 5, wherein the inner hub comprises at least one rim component coupled to and extending radially inwardly from the outer ground-engaging element, the at least one rim component being configured to rotate relative to the sensor as the press wheel moves over the closed furrow.

9. The row unit of claim 5, wherein the inner hub comprises a radially inner non-rotating portion and a radially outer rotating portion, the radially outer rotating portion of the inner hub being coupled to the outer ground-engaging element for rotation therewith and being configured to rotate relative to the sensor as the press wheel moves over the closed furrow.

10. A wheel assembly configured for use with an agricultural implement, the wheel assembly comprising:
    a press wheel comprising an outer ground-engaging element and an inner hub extending radially inwardly from the outer ground-engaging element, the press wheel defining an internal cavity radially inwardly relative to the outer ground-engaging element; and
    a sensor positioned within the internal cavity of the press wheel, wherein the sensor has a field of view directed through a portion of the press wheel.

11. The wheel assembly of claim 10, wherein the sensor is configured to generate data indicative of one or more operating parameters associated with an agricultural operation performed using the agricultural implement.

12. The wheel assembly of claim 10, further comprising an axle extending axially along an axis of rotation of the press wheel, the sensor being coupled to the axle.

13. The wheel assembly of claim 11, wherein an axle is configured to rotate with the inner hub about an axis of rotation, the sensor being coupled to the axle such that the axle is configured to rotate relative to the sensor.

14. The wheel assembly of claim 10, wherein the inner hub comprises at least one rim component coupled to and extending radially inwardly from the outer ground-engaging element, the at least one rim component being configured to rotate relative to the sensor.

15. The wheel assembly of claim 10, wherein the inner hub comprises a radially inner non-rotating portion and a radially outer rotating portion, the radially outer rotating portion of the inner hub being coupled to the outer ground-engaging element for rotation therewith and being configured to rotate relative to the sensor.

16. A row unit configured for use with an agricultural implement, the row unit comprising:
    a frame;
    a furrow opening assembly supported relative to the frame and being configured to create a furrow in soil;
    a furrow closing assembly supported relative to the frame and being configured to close the furrow formed in the soil;
    a press wheel supported relative to the frame and being configured to move over the closed furrow;
    wherein the press wheel comprises an outer ground-engaging element; and
    a sensor supported within the press wheel, wherein the outer ground-engaging element is configured to rotate relative to the sensor.

17. The row unit of claim 16, wherein the press wheel defines an internal cavity, the sensor being positioned within the internal cavity of the press wheel.

18. The row unit of claim 16, wherein the press wheel comprises an inner hub extending radially inwardly from the outer ground-engaging element, the sensor being positioned within an internal cavity of the press wheel defined radially inwardly relative to the outer ground-engaging element.

19. The row unit of claim 18, wherein the inner hub comprises a radially inner portion and a radially outer rotating portion, the radially outer rotating portion of the inner hub being coupled to the outer ground-engaging element for rotation therewith and being configured to rotate relative to the sensor as the press wheel moves over the closed furrow.

20. The row unit of claim 16, further comprising an axle extending axially along an axis of rotation of the press wheel.

21. The row unit of claim 20, wherein the outer ground-engaging element rotates about the axis of rotation as the press wheel moves over the closed furrow, and wherein the sensor is radially spaced from the axis of rotation.

* * * * *